(12) United States Patent
Hasegawa (10) Patent No.: US 10,935,728 B2
(45) Date of Patent: Mar. 2, 2021

(54) OPTICAL FIBER TERMINAL STRUCTURE, OPTICAL ELEMENT CONNECTION STRUCTURE, AND METHOD FOR MANUFACTURING OPTICAL FIBER TERMINAL STRUCTURE

(71) Applicant: FURUKAWA ELECTRIC CO., LTD., Tokyo (JP)

(72) Inventor: Junichi Hasegawa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/694,645

(22) Filed: Nov. 25, 2019

(65) Prior Publication Data
US 2020/0088948 A1 Mar. 19, 2020

Related U.S. Application Data

(63) Continuation of application No. PCT/JP2018/020768, filed on May 30, 2018.

(30) Foreign Application Priority Data

May 30, 2017 (JP) .............................. JP2017-106794

(51) Int. Cl.
*G02B 6/30* (2006.01)
*G02B 6/38* (2006.01)

(52) U.S. Cl.
CPC .............. *G02B 6/30* (2013.01); *G02B 6/3812* (2013.01); *G02B 6/3846* (2013.01); *G02B 6/3885* (2013.01)

(58) Field of Classification Search
CPC ...... G02B 6/30; G02B 6/3812; G02B 6/3846; G02B 6/3885; G02B 6/3624; G02B 6/024; G02F 1/035
See application file for complete search history.

(56) References Cited

U.S. PATENT DOCUMENTS 5,692,081 A * 11/1997 Takahashi ............ G02B 6/2937
385/60
6,322,256 B1 * 11/2001 Inada ..................... G02B 6/255
385/59
(Continued)

FOREIGN PATENT DOCUMENTS

JP S62-035307 A 2/1987
JP 2005-43442 A 2/2005
(Continued)

OTHER PUBLICATIONS

Decision to Grant a Patent issued in Japanese Patent Application No. 2017-106794 dated Apr. 10, 2020.
(Continued)

*Primary Examiner* — Ellen E Kim
(74) *Attorney, Agent, or Firm* — Marshall, Gerstein & Borun LLP (57) ABSTRACT

An optical fiber terminal structure is comprised of a plurality of optical fibers, a plurality of high-Δ optical fibers connected to the optical fibers, respectively, and a capillary. The capillary has a hole in which the optical fibers and the high-Δ optical fibers are inserted, and the optical fibers and the high-Δ optical fibers together are fixed in the hole. Connection parts of each of the optical fibers and the high-Δ optical fibers are also positioned inside the capillary, and end surfaces of the high-Δ optical fibers are exposed so that adjacent high-Δ optical fibers are in contact with each other in an end surface of the capillary.

4 Claims, 10 Drawing Sheets

(56) References Cited

U.S. PATENT DOCUMENTS

| | | | | |
|---|---|---|---|---|
| 6,463,195 B1 | * | 10/2002 | Sasaki | G02B 6/2835 385/43 |
| 6,464,404 B1 | * | 10/2002 | Robinson | G02B 6/04 385/137 |
| 6,981,802 B2 | * | 1/2006 | Sasaki | G02B 6/3809 385/60 |
| 9,158,064 B2 | | 10/2015 | Saito et al. | |
| 10,012,803 B2 | * | 7/2018 | Watanabe | G02B 6/4202 |
| 10,678,012 B1 | * | 6/2020 | Wu | G02B 6/4472 |
| 2003/0063832 A1 | | 4/2003 | Hellman et al. | |
| 2005/0031280 A1 | * | 2/2005 | Izoe | G02B 6/105 385/123 |
| 2006/0204195 A1 | * | 9/2006 | Kurosawa | G02B 6/02366 385/125 |
| 2010/0014802 A1 | | 1/2010 | Chapman et al. | |
| 2011/0142402 A1 | * | 6/2011 | Tachikura | G02B 6/2551 385/96 |
| 2014/0010500 A1 | * | 1/2014 | Saito | G02B 6/40 385/70 |
| 2014/0010501 A1 | * | 1/2014 | Saito | G02B 6/3885 385/70 |
| 2017/0199341 A1 | | 7/2017 | Takahashi et al. | |
| 2017/0276867 A1 | * | 9/2017 | Kopp | G02B 6/02042 |

FOREIGN PATENT DOCUMENTS

| | | |
|---|---|---|
| JP | 2014-219509 A | 11/2014 |
| JP | 2014-228639 A | 12/2014 |
| WO | WO-2012/121320 A1 | 9/2012 |
| WO | WO-2016/021589 A1 | 2/2016 |
| WO | WO-2016/056659 A1 | 4/2016 |

OTHER PUBLICATIONS

International Search Report issued in PCT Patent Application No. PCT/JP2018/020768 dated Aug. 21, 2018.
Notice of Reasons for Refusal issued in Japanese Patent Application No. 2017-106794 dated Jun. 26, 2019.
Notice of Reasons for Refusal issued in Japanese Patent Application No. 2017-106794 dated Dec. 20, 2019.

* cited by examiner

OPTICAL FIBER TERMINAL STRUCTURE, OPTICAL ELEMENT CONNECTION STRUCTURE, AND METHOD FOR MANUFACTURING OPTICAL FIBER TERMINAL STRUCTURE

TECHNICAL FIELD

The present invention relates to an optical fiber terminal structure that can be connected to an optical element, such as a coherent mixer chip, and the like.

BACKGROUND OF THE DISCLOSURE

In optical communications, optical fibers and optical elements are connected to each other to be used. For example, in an optical communication system where phase modulation is used, a coherent mixer that mixes signal light and local oscillating light is used as a receiver. An optical element having a plurality of input ports, such as a coherent mixer, is used with optical fibers that are optically connected to the input ports, respectively (Japanese Unexamined Patent Application Publication No. 2014-219509, for example).

Figure 11A:
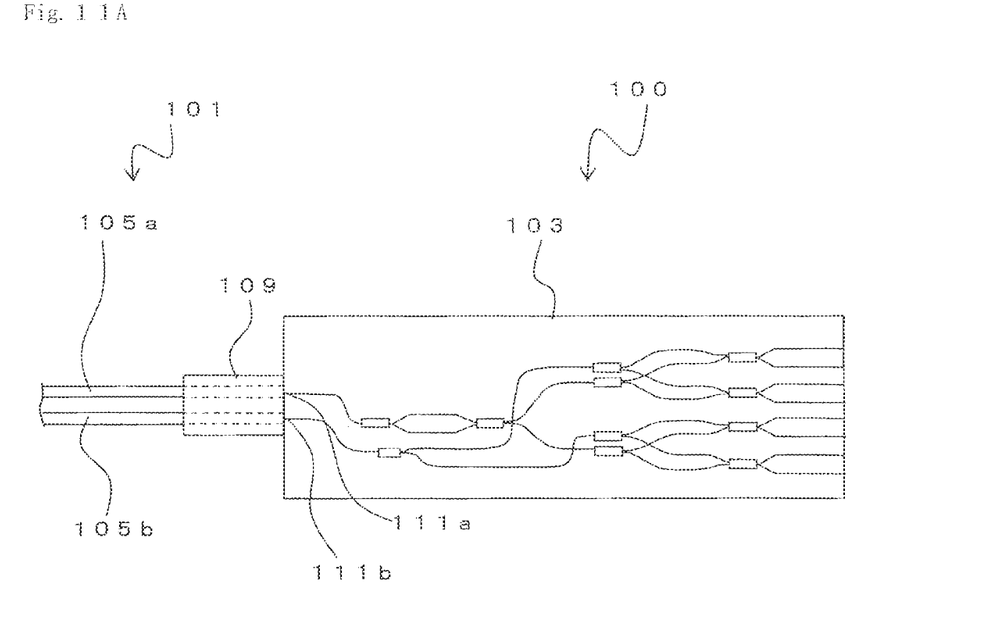
FIG. 11a is a view showing a conventional optical element connection structure 100.

FIG. 11a is a schematic view showing a conventional optical element connection structure 100. The optical element connection structure 100 is a connection structure between a coherent mixer chip 103 and an optical fiber terminal structure 101. The coherent mixer chip 103 includes a signal port 111a and a local oscillation light port 111b to which signal light enters. That is, the coherent mixer chip 103 includes a plurality of input ports.

Figure 11B:
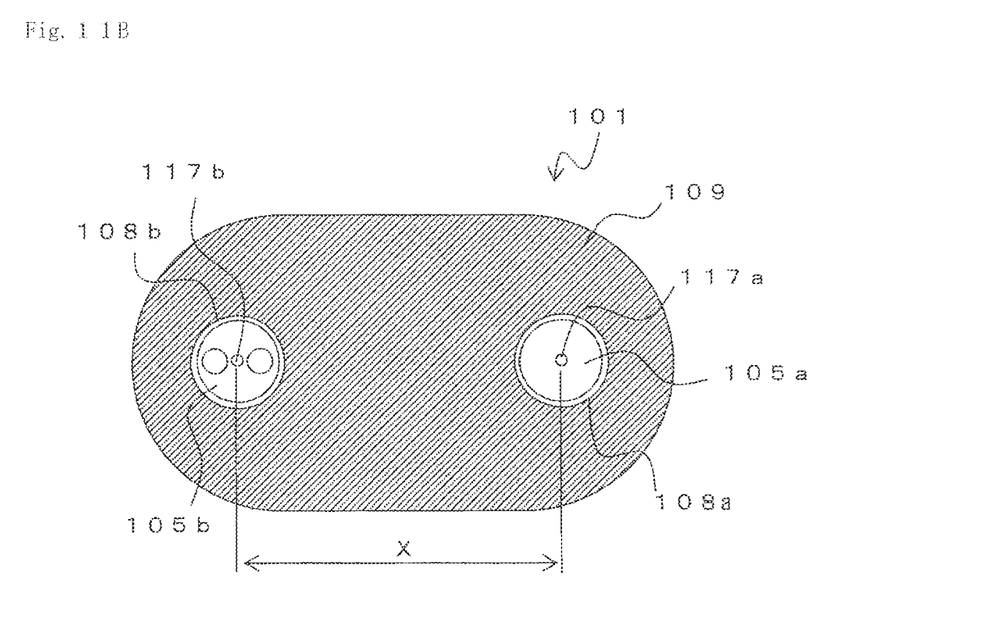
FIG. 11b is a cross sectional view of a conventional optical fiber terminal structure 101.

FIG. 111b is a cross sectional view of the optical fiber terminal structure 101. The optical fiber terminal structure 101 includes optical fibers 105a and 105b, and a capillary 109. The optical fibers 105a and 105b are inserted into holes 108a and 108b of the capillary 109, respectively. Also, the optical fiber terminal structure 101 is joined to the coherent mixer chip 103, optically connecting the optical fiber 105a, which is a single mode optical fiber, to the signal port 111a and optically connecting the optical fiber 105b, which is a polarization-maintaining optical fiber, to the local oscillation light port 111b.

At this time, a pitch between cores 117a and 117b of the respective optical fibers 105a and 105b (X in the drawing) is required to be substantially equal to a port pitch between the signal port 111a and the local oscillation light port 111b. The coherent mixer chip 103 is manufactured by using an existing semiconductor manufacturing technology that allows the port pitch between the signal port 11a and the local oscillation light port 111b to have an extremely high accuracy, and the port pitch is set for 500 μm, for example.

On the other hand, the pitch between the cores 117a and 117b of the respective optical fibers 105a and 105b in the optical fiber terminal structure 101 includes a composite of various errors. For example, the optical fiber 105a or 105b having a diameter of 125 μm has a linear diameter tolerance of ±0.5 μm. Also, a pitch between the holes 108a and 108b of the capillary 109 that is set at 500 μm includes a pitch tolerance of ±0.1 μm. Furthermore, the hole diameter of the hole 108a and 108b, which is 126.5 μm, includes a hole diameter tolerance of ±0.5 μm.

Accordingly, by adding the errors of every part, the pitch between the cores 117a and 117b in the optical fiber terminal structure 101 is 500 μm with a tolerance of ±2.25 μm. That is, each of the cores 117a and 117b may have position shifting of 1.125 μm on one side at most.

As mentioned above, the pitch between the signal port 111a and the local oscillation light port 111b, which are connected to the cores 117a and 117b, is set at approximately 500 μm in the manufacture. Thus, the above-mentioned position shifting is a shifting of optical axes at every optical connection part. Such shifting of optical axes causes optical coupling loss at the connection parts.

On the other hand, there has been a strong demand in downsizing of passive-system waveguides in recent years, and an attempt to increase a relative refractive index difference Δ between a core and a cladding by changing materials has been made. For example, there is a high-Δ quartz waveguide (PLC) having a high relative refractive index difference Δ, in which the material for the core is changed from $GeO_2$—$SiO_2$ to $ZrO_2$—$SiO_2$. $ZrO_2$ is a material having a higher refractive index and a smaller thermal expansion coefficient compared to generally used $GeO_2$. For these reasons, $ZrO_2$ is expected as a material that allows PLC elements or other optical components including PLC elements to downsize and that can reduce stress remaining in the waveguide.

Under such circumstances, the inventors have developed a small-sized coherent mixer chip by applying the high-Δ waveguide to the coherent mixer chip 103. When the relative refractive index difference Δ between a core and a cladding of an optical waveguide is increased, confinement of light within the core becomes stronger and a mode field diameter to achieve single mode propagation is decreased. Thus, increasing the relative refractive index difference Δ of the coherent mixer chip 103 can make the waveguides closer to each other and, for example, the pitch between the signal port 111a and the local oscillation light port 111b can be also reduced.

However, when the mode field diameter is decreased, a beam diameter of light propagating the core is also decreased. This leads to a problem of an increase in a connection loss between the optical element in which the optical waveguide is formed and the optical fiber that inputs and outputs the light to and from the optical element.

For example, a commonly used single mode optical fiber having a diameter of 125 μm has a mode field diameter of approximately 10 μm. When there is a shifting of 1.125 μm in the optical axis thereof, a coupling loss of approximately 0.2 dB occurs. The coupling loss of this degree may not be a big issue.

On the other hand, in a connection between a high-Δ waveguide and a single mode optical fiber, to achieve a low connection loss, a high-Δ optical fiber in which the mode field diameter is adjusted (the mode field diameter is 3 μm, for example), is used in some cases. In the case where the mode filed diameter is small, an optical axis shifting of approximately 1 μm may generate a coupling loss of 2 dB or more. That is, the higher the is, the smaller the tolerance for the optical axial shifting becomes. Thus, higher accuracy is required for the pitch in the optical fiber terminal structure.

SUMMARY OF THE DISCLOSURE

The present invention was made in view of such problems. Its object is to provide a small-sized low-loss optical fiber terminal structure of a capillary fiber array that can be connected with an optical element, and the like.

To achieve the above object, a first invention is an optical fiber terminal structure including a plurality of optical fibers, a plurality of high-Δ optical fibers that are connected to the optical fibers respectively, the high-Δ optical fiber having a higher relative refractive index difference of a core to a cladding than that of the optical fiber, and a capillary having a hole through which the high-Δ optical fibers and the optical fibers are inserted, the capillary fixing the high-Δ optical fibers and the optical fibers as a whole. Connection parts between the high-Δ optical fibers and the optical fibers are positioned inside the capillary. End surfaces of the high-Δ optical fibers are exposed on an end surface of the capillary so that the adjacent high-Δ optical fibers are in contact with each other.

Among the at least two optical fibers, one of the optical fibers is a single mode optical fiber. The single mode optical fiber may be connected to a high-Δ single mode optical fiber having a higher relative refractive index difference of a core to a cladding than that of the single mode optical fiber. The other optical fiber may be a polarization maintaining optical fiber. The polarization maintaining optical fiber may be connected to a high-Δ polarization maintaining optical fiber having a higher relative refractive index difference of a core to a cladding than that of the polarization maintaining optical fiber.

An arrangement direction of a core and a stress-applying member in the high-Δ polarization maintaining optical fiber may substantially correspond to an arrangement direction of the high-Δ single mode optical fiber and the high-Δ polarization maintaining optical fiber.

It is preferable that a core diameter of the high-Δ optical fiber gradually increases toward a core diameter of the optical fiber at the connection part between the optical fiber and the high-Δ optical fiber.

The optical fiber terminal structure may further include a dummy fiber and centers of the plurality of the high-Δ optical fibers disposed side by side and a center of the dummy fiber are disposed in a close-packed arrangement so that the high-Δ optical fibers and the dummy fiber are in contact with each other.

According to the first invention, by connecting an optical element having high relative refractive index difference with an optical fiber via a high-Δ optical fiber, the coupling loss at each connection part can be reduced. Also, since the adjacent high-Δ optical fibers are in contact with each other, it is possible to decrease an error of a core pitch and to reduce the coupling loss at the connection part of the both.

Also, if one of two of the optical fibers is a single mode optical fiber and the other is a polarization maintaining optical fiber, the optical fibers can be efficiently connected to input ports of a coherent mixer chip.

In particular, by making an arrangement direction of a core and a stress-applying member in the high-Δ polarization maintaining optical fiber substantially correspond to an arrangement direction of the high-Δ single mode optical fiber and the high-Δ polarization maintaining optical fiber, the optical fibers can be optically connected to the coherent mixer chip with certainty.

Also, if centers of the plurality of the high-Δ optical fibers disposed side by side and a dummy fiber are densely disposed in a close-packed arrangement to form an approximately a regular angle so that the optical fibers and the dummy fiber are in contact with each other, the high-Δ optical fibers can be disposed stably while being in contact with each other.

A second invention is a connection structure between the optical fiber terminal structure according to the first invention and a coherent mixer chip. The coherent mixer chip includes a signal port and a local oscillation light port as input ports. The coherent mixer chip is a high relative refractive index difference optical element, a relative refractive index difference of a core to a cladding of a waveguide of which is between 2.5% and 10%. A pitch between the signal port and the local oscillation light port is approximately equal to a core pitch between the high-Δ single mode optical fiber and the high-Δ polarization maintaining optical fiber. The high-Δ single mode optical fiber is connected to the signal port, and the high-Δ polarization maintaining optical fiber is connected to the local oscillation light port.

The second invention can provide an optical element connection structure between a small coherent mixer chip, which is a high relative refractive index difference optical element, and an optical fiber terminal structure, in which loss at optical coupling parts is small.

A third invention is a method for manufacturing an optical fiber terminal structure. The method includes connecting a single mode optical fiber and a high-Δ single mode optical fiber having a higher relative refractive index difference of a core to a cladding than that of the single mode optical fiber to form a first optical fiber, connecting a polarization maintaining optical fiber and a high-Δ polarization maintaining optical fiber having a higher relative refractive index difference of a core to a cladding than that of the polarization maintaining optical fiber to form a second optical fiber, holding the first optical fiber and the second optical fiber so as to be movable by rotation, relatively rotating the second optical fiber and the first optical fiber to make an arrangement direction of a core and a stress-applying member of the high-Δ polarization maintaining optical fiber substantially correspond to an arrangement direction of the first optical fiber and the second optical fiber, and also contacting tip ends of the first optical fiber and the second optical fiber with an adhesive agent so that surface tension of the adhesive agent adheres and bonds the high-Δ single mode optical fiber and the high-Δ polarization maintaining optical fiber together, inserting the first optical fiber and the second optical fiber through a capillary after the adhesive agent is cured while positioning a connection part between the single mode optical fiber and the high-Δ single mode optical fiber and a connection part between the polarization maintaining optical fiber and the high-Δ polarization maintaining optical fiber inside the capillary, fixing the first optical fiber and the second optical fiber to the capillary, and polishing an end surface of the capillary to obtain an optical fiber terminal structure in which the high-Δ single mode optical fiber and the high-Δ polarization maintaining optical fiber are disposed at the end surface of the capillary being in contact with each other.

According to the third invention, high-Δ optical fibers being in contact with each other can be easily bonded to each other with accuracy and fixed at predetermined intervals.

The present invention can provide a small-sized low-loss optical fiber terminal structure of a capillary fiber array that can be connected with an optical element.

BRIEF DESCRIPTION OF DRAWINGS

FIG. 2b is a cross sectional view taken along A-A line in FIG. 2a.

FIG. 3 is a schematic view showing a core shape at a section B in FIG. 2a.

FIG. 4b is a lower end face view of FIG. 4a.

FIG. 5b is a lower end face view of FIG. 5a.

FIG. 8a is a view showing a capillary 9a.

FIG. 10 is a view showing another arrangement of the high-Δ optical fiber 7a.

DETAILED DESCRIPTION

Figure 1:
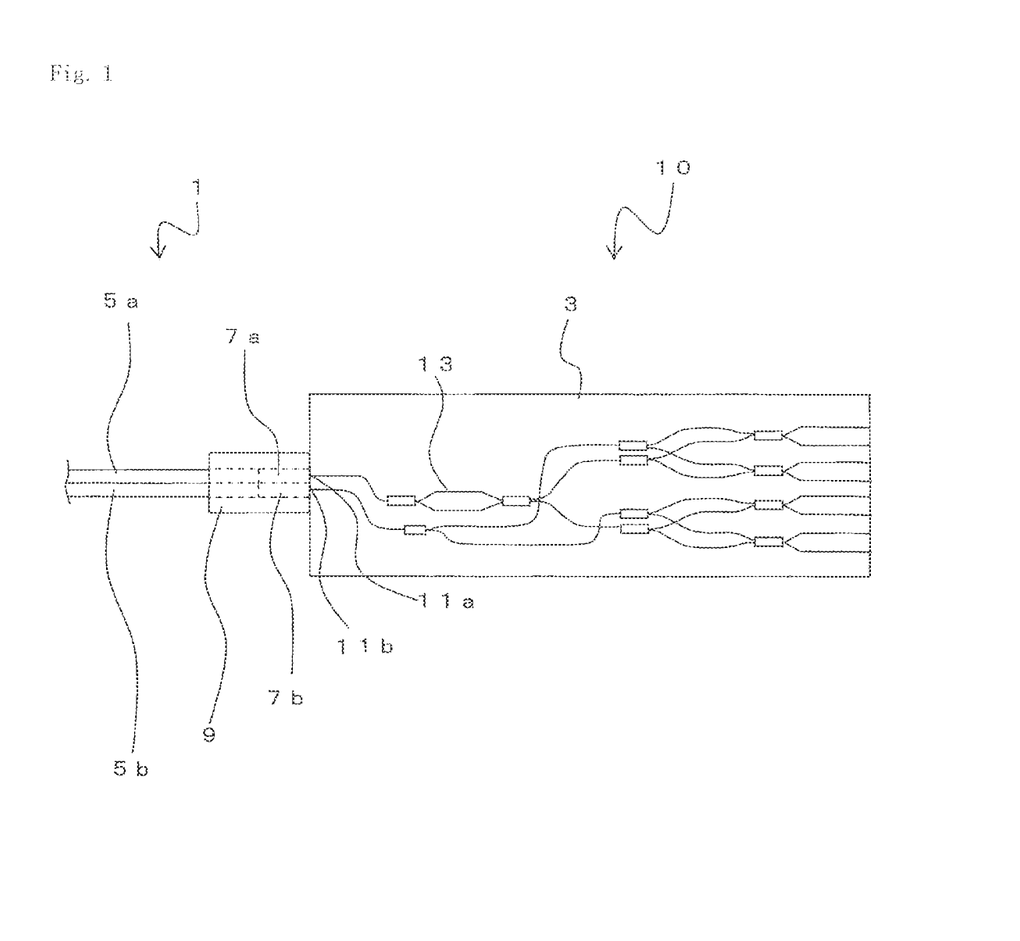
FIG. 1 is a view showing an optical element connection structure 10.

Hereinafter, an optical element connection structure 10 according to an embodiment of the present invention will be described. FIG. 1 is a schematic view showing the optical element connection structure 10. The optical element connection structure 10 is a connection structure between an optical element and an optical fiber terminal structure 1. Although a coherent mixer chip 3 will illustrate the optical element in the descriptions hereinafter, an optical element other than the coherent mixer chip 3 may also be used.

The coherent mixer chip 3 is used as an optical receiver in a phase modulation optical communication system. The coherent mixer chip 3 mixes a signal light as a reference light with a local oscillation light to extract optical signal phase information.

The relative refractive index difference of a core to a cladding of a waveguide 13 of the coherent mixer chip 3 is between 2.5% and 10% and more preferably between 5.5% and 10%. Also, a mode field diameter of the waveguide 13 at 1550 nm is approximately 3 μm. That is, the coherent mixer chip 3 is a high relative refractive index difference optical element (high-Δ optical element). Increasing the relative refractive index difference of the coherent mixer chip 3 in this way can downsize the coherent mixer chip 3.

The term 'mode field diameter' and the other terms that are not specifically defined in the present description appropriately follow the definitions and measurement methods speculated in ITU-T (International Telecommunication Union) G.650.1.

Also, the relative refractive index difference is a numerical value that can be defined as below.

$$\Delta = \{(n_d - n_c)/n_d\} \times 100$$

wherein $n_d$ is a maximum refractive index of the core and $n_c$ is a refractive index of the cladding.

The coherent mixer chip 3 has a signal port 11a to which a signal light enters and a local oscillation light port 11b to which a local oscillation light enters. The signal port 11a and the local oscillation light port 11b are disposed on a same side face of the coherent mixer chip 3 with a predetermined pitch.

Figure 2A:
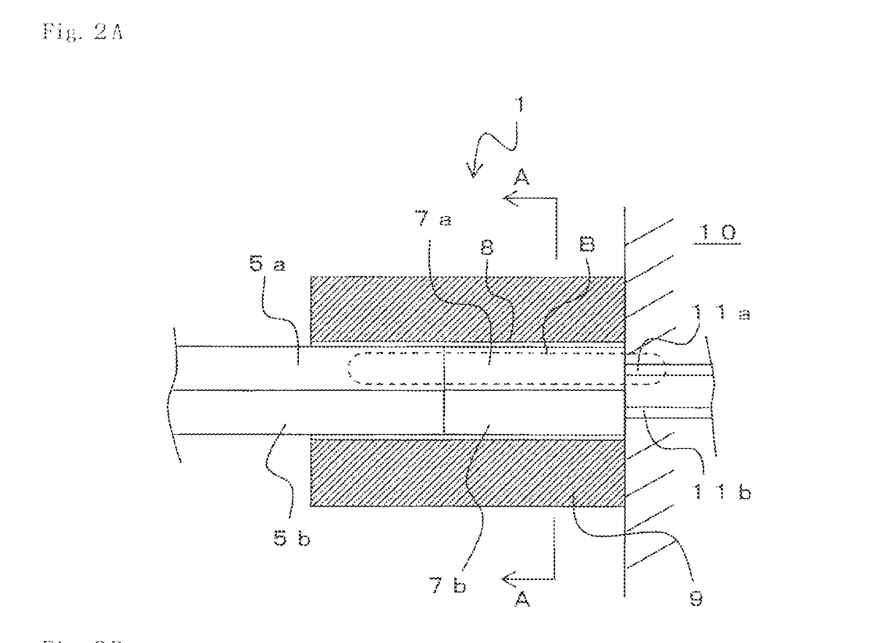
FIG. 2a is a cross sectional view of an optical fiber terminal structure 1.
Figure 2B:
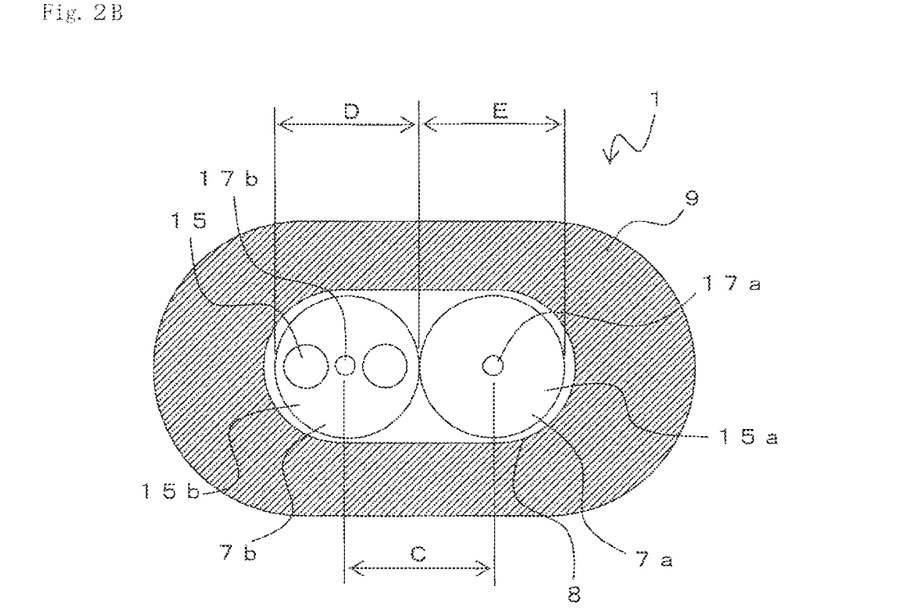

The optical fiber terminal structure 1 is connected to the coherent mixer chip 3. FIG. 2a is an enlarged cross sectional view of the optical fiber terminal structure 1 and FIG. 2b is a cross sectional view taken along A-A line in FIG. 2a. A joint interface between the coherent mixer chip 3 and the optical fiber terminal structure 1 is formed being slanted to prevent reflections, and the coherent mixer chip 3 and the optical fiber terminal structure 1 are adhered to each other with an adhesive agent, for example.

The optical fiber terminal structure 1 includes a plurality of optical fibers 5a and 5b, a plurality of high-Δ optical fibers 7a and 7b that are connected to the optical fibers 5a and 5b respectively, a capillary 9, and so on. The high-Δ optical fiber 7a has a higher relative refractive index difference of a core 17a to a cladding 15a than that of the optical fiber 5a. Similarly, the high-Δ optical fiber 7b has a higher relative refractive index difference of a core 17b to a cladding 15b than that of the optical fiber 5b.

The capillary 9 has a hole 8 through which the optical fibers 5a and 5b and the high-Δ optical fibers 7a and 7b are inserted. The optical fibers 5a and 5b and the high-Δ optical fibers 7a and 7b are fixed as a whole to the hole 8. Also, connection parts of each of the optical fibers 5a and 5b and the high-Δ optical fibers 7a and 7b are positioned inside the capillary 9, and end surfaces of the high-Δ optical fibers 7a and 7b are exposed on an end surface of the capillary 9 so that adjacent high-Δ optical fibers 7a and 7b are in contact with each other.

It is preferable that a length of the capillary 9 is 1.5 mm to 5 mm, for example, and a length of the high-Δ optical fibers 7a and 7b inside the capillary 9 is approximately 1 mm to 4 mm. If the lengths of the high-Δ optical fibers 7a and 7b are too long, the capillary size becomes too large. If the lengths of the high-Δ optical fibers 7a and 7b are too short, reducing effects of connection loss at the connecting parts between the optical fibers 5a and 5b and the high-Δ waveguide via the high-Δ optical fibers 7a and 7b becomes smaller. Also, if the length of the capillary 9 is too long, the whole connection structure becomes too large. If the length of the capillary is too short, protections of the connection parts between the optical fibers 5a and 5b with the high-Δ optical fibers 7a and 7b are insufficient.

The number of the optical fibers or the like is not limited to the illustrated examples. However, the optical fiber terminal structure 1 includes at least two optical fibers 5a and 5b, and one of the optical fibers, i.e. the optical fiber 5a, is a single mode optical fiber. That is, the single mode optical fiber is connected with the high-Δ optical fiber 7a (a high-Δ single mode optical fiber), which has a higher relative refractive index difference of the core 17a to the cladding 15a than that of the single mode optical fiber.

The single mode optical fiber conforms to ITU-T G.652 and is an optical fiber that has a zero dispersion wavelength in a 1.3 μm band. In a common single mode optical fiber, the relative refractive index difference of a core to a cladding is approximately 0.3% and the mode field diameter at 1550 nm is approximately 10 μm.

Similarly, the other optical fiber 5b is a polarization maintaining optical fiber, in which a stress-applying member 15 is formed on each side of the core 17b to a single mode optical fiber. The optical fiber 5b is connected with the high-Δ optical fiber 7b (a high-Δ polarization maintaining optical fiber), which has a higher relative refractive index difference of the core 17b to the cladding 15b than that of the optical fiber 5b. An arrangement direction of the core 17b and the stress-applying members 15 in the high-Δ optical fiber 7b substantially corresponds to an arrangement direction of the high-Δ optical fiber 7a and the high-Δ optical fiber 7b.

As shown in FIG. 2b, the high-Δ optical fibers 7a and 7b are in contact with each other. Also, the high-Δ optical fiber 7a (the high-Δ single mode optical fiber) is connected to the signal port 11a, and the high-Δ optical fiber 7b (the high-Δ polarization maintaining optical fiber) is connected to the local oscillation light port 11*b*. That is, a pitch between the signal port 11*a* and the local oscillation light port 11*b* is approximately equal to a pitch between the cores 17*a* and 17*b* of the high-Δ optical fibers 7*a* and 7*b* (C in the drawing).

Here, the pitch between the cores 17*a* and 17*b* of the high-Δ optical fibers 7*a* and 7*b* is not affected by errors occurring from the size or position of the hole 8 of the capillary 9. That is, since the high-Δ optical fibers 7*a* and 7*b* are in contact with each other, the pitch between the cores 17*a* and 17*b* is generally affected by only errors arisen from outer diameters of the high-Δ optical fibers 7*a* and 7*b*. For example, when each of the outer diameters of the high-Δ optical fiber 7*a* (E in the drawing) and the high-Δ optical fiber 7*b* (D in the drawing) is 125 μm±0.5 μm, a pitch C between the cores 17*a* and 17*b* can be set with an accuracy of 125 μm±0.5 μm. When the pitch tolerance is 0.5 μm at most, the coupling loss due to a pitch difference can be 1 dB or less even if the mode field diameter is 3 μm, for example.

Also, the pitch C between the cores 17*a* and 17*b* is not affected by the size of the hole 8 in the capillary 9. Thus, it is possible to make the size of the hole 8 (a clearance) larger compared to a size of the high-Δ optical fiber 7*a* and 7*b*. For example, the size (design value) of an oval shape of the hole 8 may be 1.5 μm or more (more preferably 2.5 μm or more) larger than a size of an oval shape circumscribing the high-Δ optical fibers 7*a* and 7*b* that are in contact with each other. In this way, an inserting operation of the high-Δ optical fibers 7*a* and 7*b* is easier, and, even if outer diameters of the connection parts between the high-Δ optical fibers 7*a* and 7*b* and the optical fibers 5*a* and 5*b* expand slightly, the high-Δ optical fibers 7*a* and 7*b* can be inserted into the hole 8 with certainty.

Figure 3:
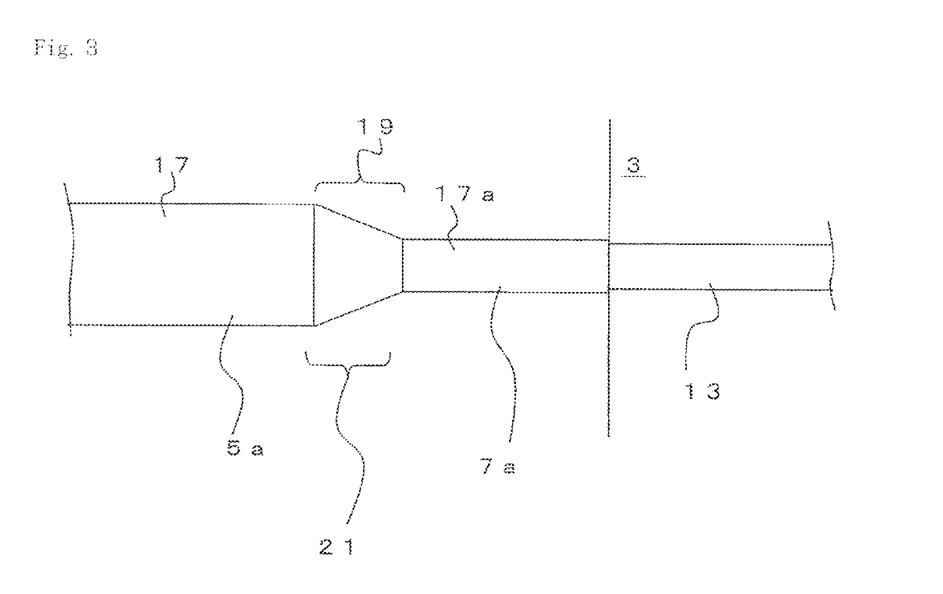

The high-Δ optical fibers 7*a* and 7*b* and the optical fibers 5*a* and 5*b* are connected by, for example, TEC (Thermally-diffused Expanded Core) fusion. FIG. 3 is a schematic view of a section B in FIG. 2*a*. Compared to the core 17*a* of the optical fiber 5*a*, which is a single mode optical fiber, the size of the core 17*a* of the high-Δ optical fiber 7*a* is smaller.

In such a case, the smaller diameter of the core 17*a* and the larger diameter of the core 17 are adjusted by the TEC process. That is, a mode field diameter convertor 21 is formed at a connection part between the optical fiber 5*a* and the high-Δ optical fiber 7*a* (a connection region 19) so as to form the diameter of the core 17*a* of the high-Δ optical fiber 7*a* being increased gradually and the diameter of the core 17 of the optical fiber 5*a* being decreased gradually. Controlling heat conditions during the fusion bonding in this way can make the difference in the mode field diameters at the connection region 19 smooth, suppresses the coupling loss to a low level, and can suppress the coupling loss to approximately 0.3 dB/facet, for example. This also applies similarly to the connection between the optical fiber 5*b* and the high-Δ optical fiber 7*b*.

Here, if a conventional method is used to directly connect the waveguide 13 of the coherent mixer chip 3, which is a high relative refractive index difference optical element, and the optical fiber 5*a*, which is a single mode optical fiber, there may be a coupling loss of approximately a several dB/facet. On the other hand, connecting the waveguide 13 and the optical fiber 5*a* via the high-Δ optical fiber 7*a* can reduce the total connection loss even though the number of connection parts is increased. For example, if the connection loss between the coherent mixer chip 3 and the high-Δ optical fiber 7*a* can be suppressed to approximately 0.4 dB/facet, the total connection loss between the coherent mixer chip 3 and the optical fiber 5*a* can be suppressed to approximately 0.7 dB/facet.

Next, a method for manufacturing the optical fiber terminal structure 1 will be described. First, the high-Δ optical fiber 7*a* is joined to a tip end of the optical fiber 5*a* to form a first optical fiber. Similarly, the high-Δ optical fiber 7*b* is joined to a tip end of the optical fiber 5*b* to form a second optical fiber.

Figure 4A:
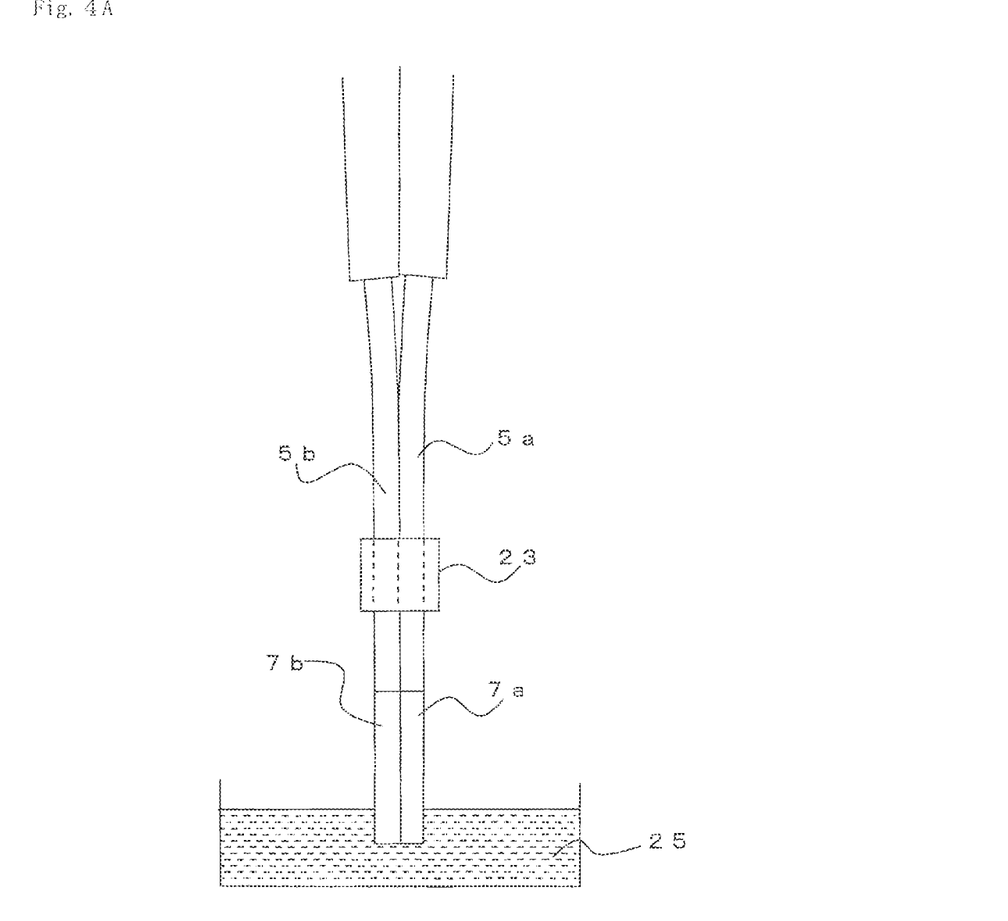
FIG. 4a is a view showing a manufacturing process of the optical fiber terminal structure 1.

Next, as shown in FIG. 4*a*, the optical fibers 5*a* and 5*b* (the high-Δ optical fibers 7*a* and 7*b*) and a dummy fiber 7*c* are held by a temporary holding member 23 so that the optical fibers can rotate freely. Tip ends of the high-Δ optical fiber 7*a* and 7*b* and the dummy fiber 7*c* protrude from an end portion of the temporary holding member 23 for the same length (approximately 10 mm, for example). The dummy fiber 7*c* is a fiber having approximately the same diameter as the optical fibers 5*a* and 5*b* (the high-Δ optical fibers 7*a* and 7*b*).

Figure 4B:
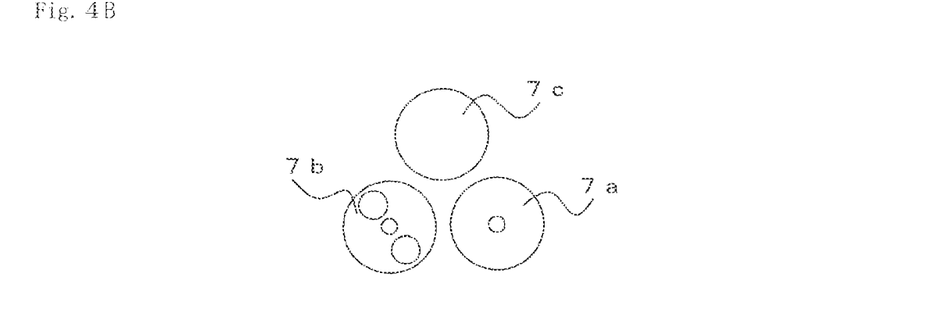

FIG. 4*b* is a schematic view showing an arrangement of the high-Δ optical fibers 7*a* and 7*b* and the dummy fiber 7*c* at the tip end portion. While being held by the temporary holding member 23, all the fibers are disposed almost in a close-packed arrangement contacting with each other. However, there are spaces formed between the fibers. In this state, the tip ends of the high-Δ optical fibers 7*a* and 7*b* and the dummy fiber 7*c* are dipped into an adhesive agent 25 that has been already stored in a container. The adhesive agent 25 is, for example, a solvent based liquid adhesive, in which high polymer solids of synthetic resin or the like are dissolved in a solvent such as water, alcohol, organic solvent or the like. In such a solvent based adhesive, adhesiveness can be obtained when the residual solute remaining after vaporization of the solvent cures.

For the adhesive agent 25, it is preferable to use an adhesive that is further diluted than the commonly used solute concentration. This can reduce viscosity of the adhesive agent and suppress the amount of the residual solute. In this way, a thickness of an adhesive layer in the spaces between the optical fibers can be approximately zero, so that the high-Δ optical fibers 7*a* and 7*b* are in contact with each other, and thus spaces between the core 17*a* and 17*b* can be uniform with more accuracy. That is, the adhesive force may be weak, and a viscosity of 1000 cps or less may be used, for example. Furthermore, an extremely low viscosity of 100 cps or less is more preferable. Also, since the adhesive agent 25 contracts in curing, an effect of pulling the high-Δ optical fibers 7*a* and 7*b* more closely to each other can be obtained. Also, it is preferable that the adhesive agent 25 has a lower refractive index than the claddings 15*a* and 15*b* of the high-Δ optical fibers 7*a* and 7*b*.

As such an adhesive agent, there are, for example, 'Cemedine C' by Cemedine, Co. diluted by a thinner liquid (it is preferable to add Fluorine for refractive index adjustment) as a solvent based adhesive, refractive index controlling resin (UV curing) by NTT-AT, Co. as an extremely low viscosity adhesive (acrylate based), and, a heat curing adhesive by Epo-Tek, Inc. as an extremely low viscosity adhesive (epoxy based). Also, heating the adhesive agent can further reduce the viscosity, and this can make the spaces between the high-Δ optical fibers 7*a* and 7*b* smaller.

The dummy fiber 7*c* is not always necessary. However, it is preferable that the plurality of the high-Δ optical fibers 7*a* and 7*b*, which are provided side by side, and the dummy fiber 7*c* are disposed so as to be in contact with each other with the centers thereof forming a substantially close-packed regular triangle. This allows the high-Δ optical fibers 7a and 7b to contact with each other with more certainty.

Figure 5A:
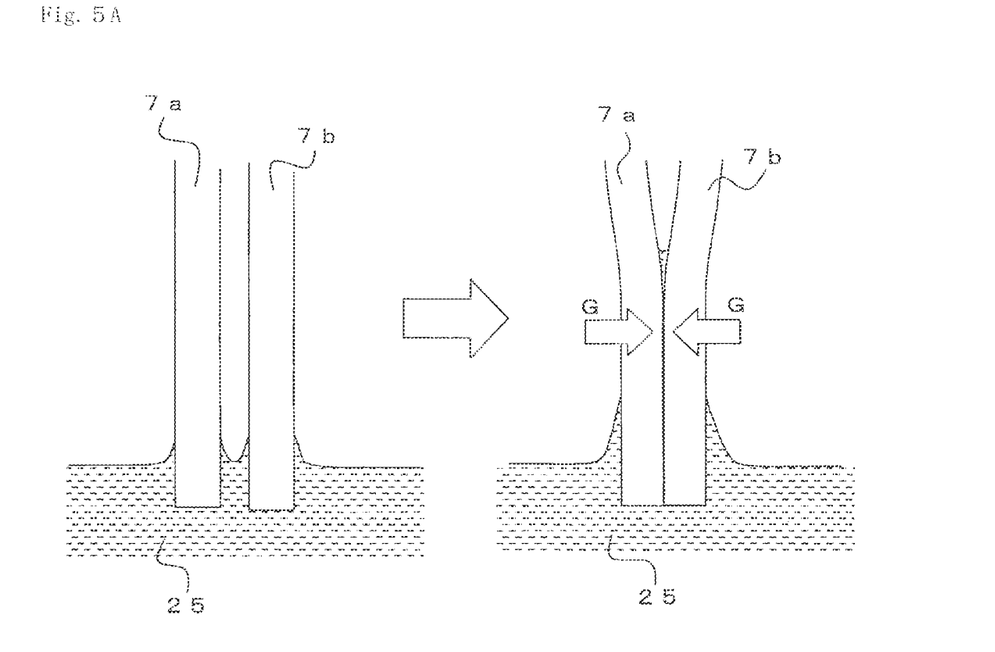
FIG. 5a is a view showing a bonding structure between high-Δ optical fibers 7a and 7b.
Figure 5B:
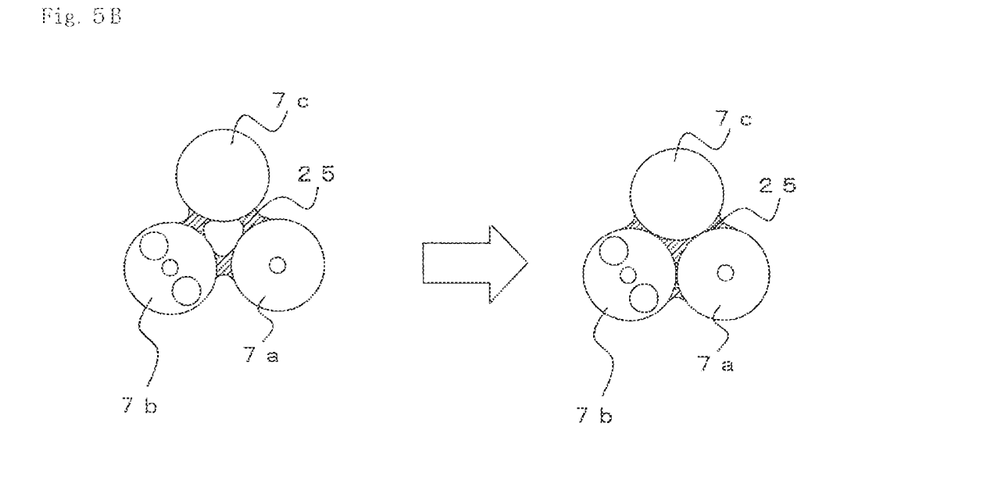

FIG. 5a and FIG. 5b are schematic views showing states of adhering the high-Δ optical fibers 7a and 7b by surface tension of the adhesive agent 25. FIG. 5a is a front view (an illustration of the dummy fiber 7c is omitted for simplicity), and FIG. 5b is an end face view.

As mentioned above, there may be spaces formed between the high-Δ optical fibers 7a and 7b and between the high-Δ optical fibers 7a and 7b and the dummy fiber 7c. However, the viscosity of the adhesive agent 25 is low, and the adhesive agent 25 is sucked up into the spaces between the high-Δ optical fibers 7a and 7b and between the high-Δ optical fibers 7a and 7b and the dummy fiber 7c due to surface tension (capillary phenomenon). At this time, the high-Δ optical fibers 7a and 7b are adhered together by each other's surface tension (in directions shown by arrows G in the drawing).

That is, as shown in FIG. 5b, even if slightly non-uniform spaces are formed between the high-Δ optical fibers 7a and 7b and between the high-Δ optical fibers 7a and 7b and the dummy fiber 7c, the adhesive agent 25 is sucked up into those spaces and the high-optical fibers 7a and 7b and the dummy fiber 7c are adhered together. At this time, the optical fibers are in an arrangement where the surface tension of the adhesive agent being sucked up and existing between the optical fibers is stabilized (i.e. the high-Δ optical fibers 7a and 7b and the dummy fiber 7c are in a close-packed arrangement with certainty), and curing the adhesive agent 25 in this state can adhere the optical fibers with the others.

If a height of the sucked adhesive agent 25 is too high (the amount of sucked adhesive agent 25 is too large), then the amount of the adhesive agent 25 between the end portions of the high-Δ optical fibers 7a and 7b increases. Thus, there is a possibility that the spaces between the high-Δ optical fibers 7a and 7b become larger. Thus, the amount of the adhesive agent 25 that is sucked up by the surface tension is preferably less than the amount that fills only the spaces between the high-Δ optical fibers 7a and 7b inside the capillary 9. That is, in FIG. 4a, it is preferable to adjust the height of the sucked adhesive agent 25 so that the height is below the temporary holding member 23 and above a polished portion, which will be described below.

One way of adjusting as above is to use the minimum required amount of the adhesive agent 25. Alternatively, the tip ends of the high-Δ optical fibers 7a and 7b and the dummy fiber 7c may be pulled out of the adhesive agent 25 when the adhesive agent 25 rises up to a predetermined height.

Since the adhesive agent 25 is a diluted solvent-based adhesive agent, there are spaces formed after curing due to contraction of the adhesive agent at portions where the optical fibers between the fibers of the fiber bundle are not closely contacting with each other.

Figure 6A:
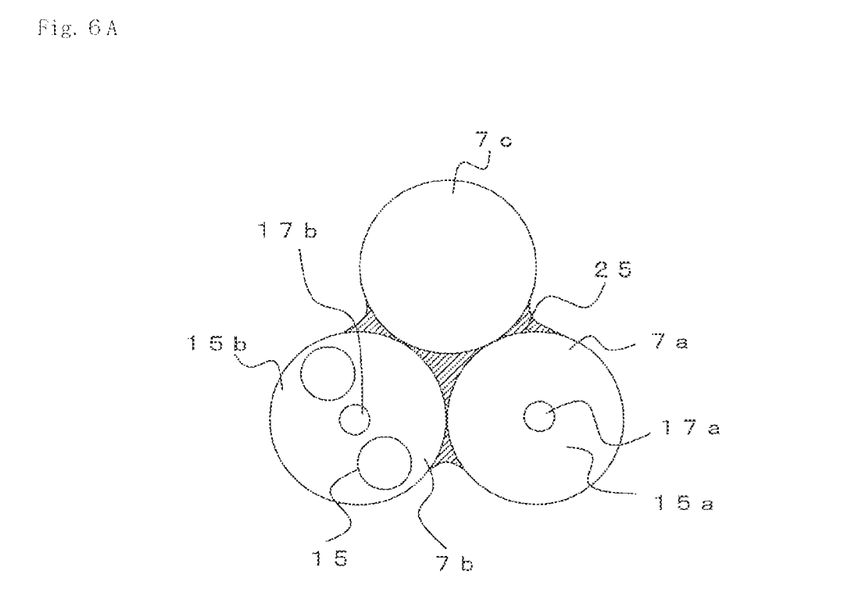
FIG. 6a is a view showing a rotational core alignment of the high-Δ optical fiber 7b.
Figure 6B:
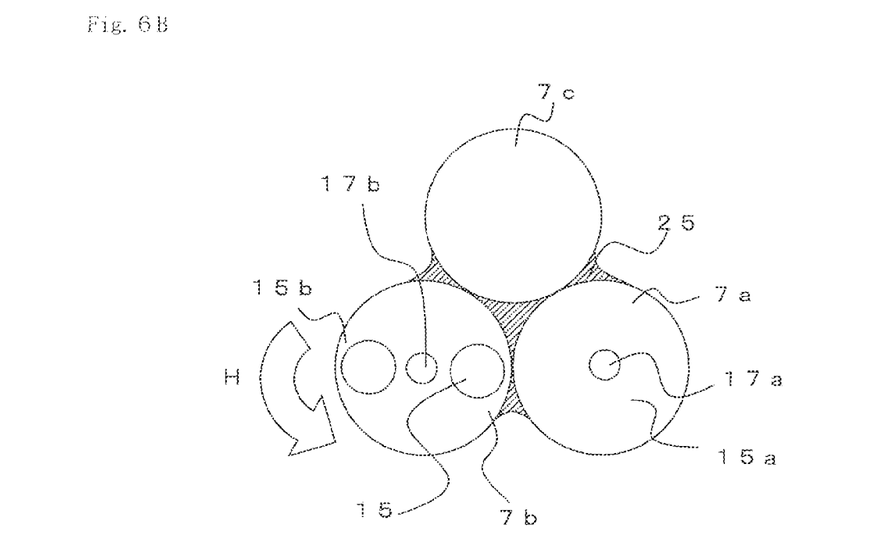
FIG. 6b is a view showing a rotational core alignment of the high-Δ optical fiber 7b.

Before the adhesive agent 25 cures, as shown in FIGS. 6a and 6b, the high-Δ optical fiber 7b is rotationally aligned (an arrow H in the drawing). That is, while watching the end faces of the high-Δ optical fibers 7a and 7b through a camera or the like, the high-Δ optical fiber 7b is rotated to make an arrangement direction of the core 17b and the stress-applying member 15 of the high-Δ optical fiber 7b substantially correspond with an arrangement direction of the high-Δ optical fiber 7a and the high-Δ optical fiber 7b. The rotational alignment of the high-Δ optical fiber 7b may be performed before adhering the adhesive agent 25. Also, the high-Δ optical fiber 7b may be fixed and the other fibers may be rotated. That is, the high-Δ optical fiber 7b and the high-Δ optical fiber 7a may be rotated relatively.

As above, by rotating the second optical fiber to make the arrangement direction of the core 17b and the stress-applying member 15 of the high-Δ optical fiber 7b substantially correspond with the arrangement direction of the first optical fiber and the second optical fiber and contacting the tip ends of the first optical fiber and the second optical fiber with the adhesive agent 25, the surface tension of the adhesive agent 25 can bring the high-Δ optical fibers 7a and 7b in close contact to be adhered with each other.

Figure 7:
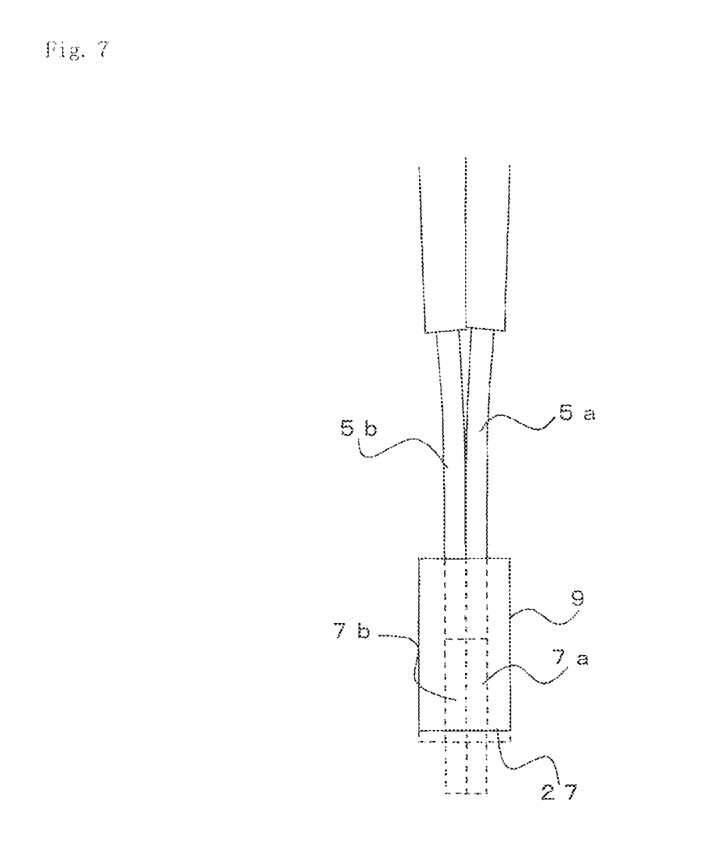
FIG. 7 is a view showing a state in which a capillary end is polished.

Next, after curing the adhesive agent 25, the dummy fiber 7c is removed. Then, as shown in FIG. 7, in a state that the high-Δ optical fibers 7a and 7b are adhered being in contact with each other, the said portion is inserted through the capillary 9 and the first optical fiber and the second optical fiber are fixed to the capillary 9 by using an adhesive agent (illustration is omitted). The adhesive agent used at this time may be heat curing epoxy adhesive or UV curing acrylate adhesive.

Next, the high-Δ optical fibers 7a and 7b protruding from the capillary 9 and a part of the capillary 9 are polished by a polishing surface 27. Accordingly, the optical fiber terminal structure 1 in which the high-Δ optical fibers 7a and 7b are disposed being in contact with each other at an end surface of the capillary 9 is formed. Instead of polishing the end surface of the optical fiber terminal structure 1 to obtain a uniform surface, a method such as cutting by a dicing saw may also be used to obtain a uniform surface.

Although it is preferable that the adhesive used to adhere the high-Δ optical fibers 7a and 7b to the capillary 9 has a low viscosity, the viscosity may be higher than the adhesive agent 25 (5000 cps or less, for example). Also, it is preferable that the contraction ratio thereof at the curing is low and the hardness thereof is high (60 shore D or more). As such an adhesive, 'Epo-tek 353-ND' by EPDXY TECHNOLOGY, Inc., which is an epoxy heat curing adhesive, and 'OP-40Z' by DIC Corporation, which is acrylate base UV curing adhesive, or a refractive index controlling resin (UV cured) by NTT-AT, Co. may be used.

In the present embodiment, the optical fibers are inserted into the temporary holding member 23 in the first process. However, the present invention is not limited thereto. For example, the capillary 9 may temporarily hold the optical fibers, and after adhering the high-Δ optical fibers 7a and 7b, the capillary 9 may be moved close to the end portions of the high-Δ optical fibers 7a and 7b and the high-Δ optical fibers 7a and 7b may be adhered and fixed to the capillary 9.

Also, as a means to improve coagulation effect of the high-Δ optical fibers 7a and 7b, wettability of surface of the high-Δ optical fibers 7a and 7b may be enhanced. To enhance wettability, a method in which a surface processing agent called primer is applied and dried and a method using plasma discharge process are known. Also, naturally, it is preferable that the high-Δ optical fibers 7a and 7b are thoroughly cleaned for the operation.

Figure 8A:
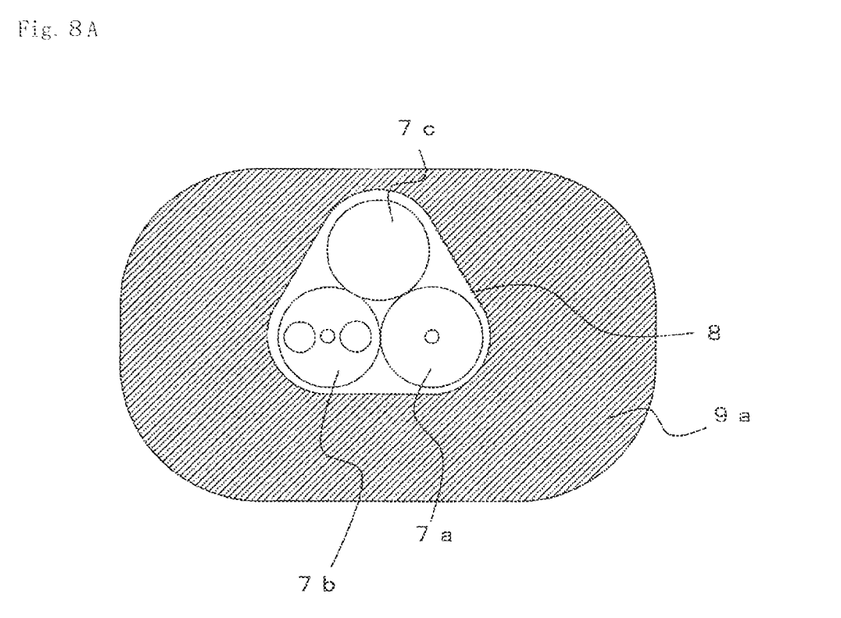

Instead of removing the dummy fiber 7c, the high-Δ optical fibers 7a and 7b and the dummy fiber 7c being in the close-packed contacting state may be fixed to the capillary. For example, as shown in FIG. 8a, a capillary 9a having the hole 8 in an approximately regular triangle shape may be used to fix the high-Δ optical fibers 7a and 7b and the dummy fiber 7c as a whole. In this case, it is preferable that the cores 17a and 17b of the high-Δ optical fibers 7a and 7b are arranged on a center line of the capillary 9a.

Figure 8B:
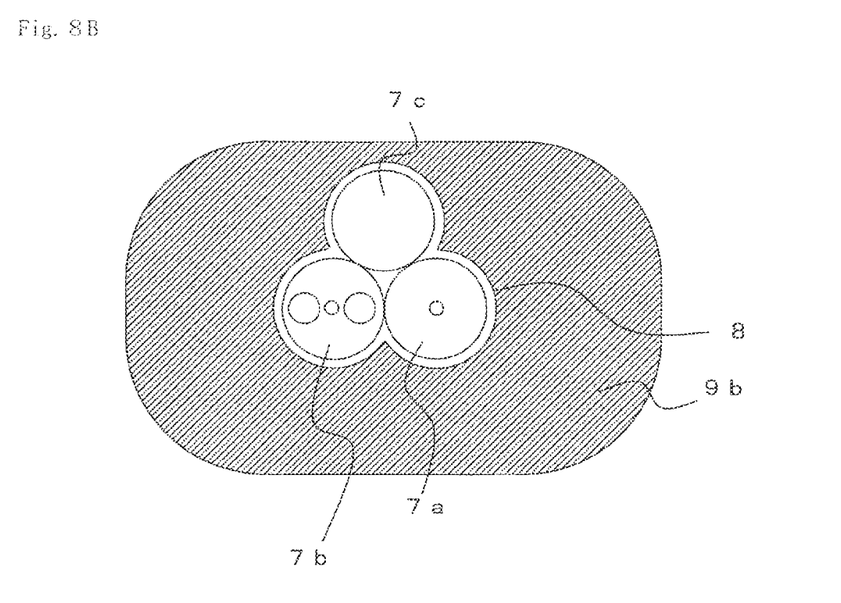
FIG. 8b is a view showing a capillary 9b.

Also, as shown in FIG. 8b, the hole 8 may be in a shape that circumscribing an outer shape of the close-packed arrangement of the high-Δ optical fibers 7a and 7b and the dummy fiber 7c. That is, when the high-Δ optical fibers 7a and 7b and the dummy fiber 7c are in the close packed arrangement, the hole 8 of the capillary 9b is formed in a shape in which there are projections at each dent shape of the outline between the fibers. In this case, each arc shaped portion of the hole 8 corresponding to each fiber outline is formed so as to cover each fiber over a range of 180° or more.

Figure 9:
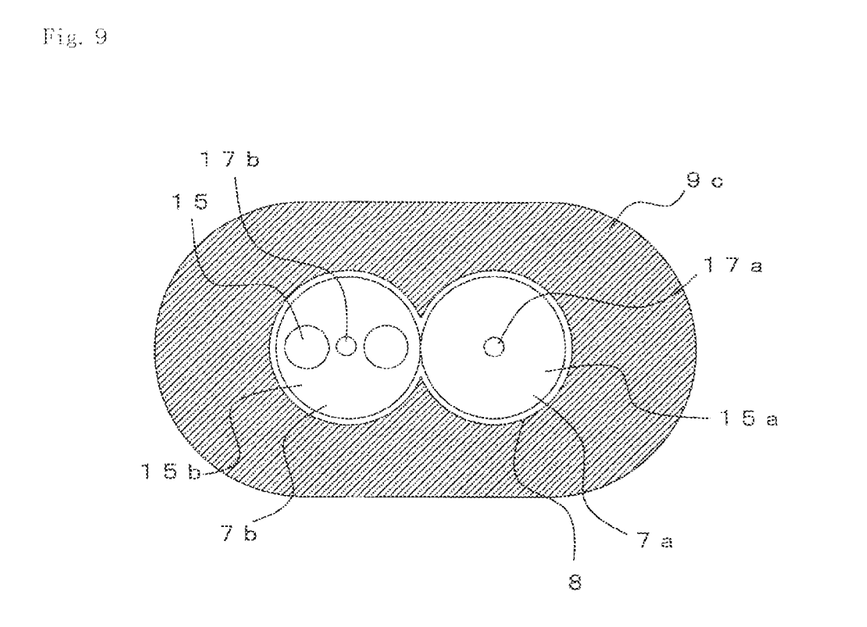
FIG. 9 is a view showing a capillary 9c.

When only the high-Δ optical fibers 7a and 7b are held in a capillary 9c as shown in FIG. 9, there may be projections formed toward an inner surface of the hole 8 at each dent shape of the outline between the high-Δ optical fibers 7a and 7b. That is, regardless of the number of the fibers, projections each having a size corresponding to each dent shape of the outline between the fibers may be formed on the inner surface of the hole 8.

The capillary 9b and 9c can hold the fibers more firmly. Also, adding equal stress from every direction onto the optical fibers can prevent deterioration of polarization extinction ratio of the high-Δ optical fiber 7b and the optical fiber 5b. Moreover, although there may be a little adhesive agent 25 remaining at a proximity of the contacting portions between the high-Δ optical fibers 7a and 7b and the dummy fiber 7c as shown in FIG. 6b and the like, the projection shapes are decided so that the cured adhesive agent 25 and ends of the projections do not interfere with each other.

As above, according to the present embodiment, the optical fiber terminal structure 1 that is particularly effective in connection with the coherent mixer chip 3 can be obtained. At this time, since the coherent mixer chip 3, which is an optical element having high relative refractive index difference, is connected with the optical fibers 5a and 5b via the high-Δ optical fibers 7a and 7b, the total coupling loss can be reduced compared to the case in which the coherent mixer chip 3 is directly connected with the optical fibers 5a and 5b.

In particular, since the core diameters of cores 17a and 17b of the high-Δ optical fibers 7a and 7b gradually increase toward the core diameters of the optical fibers 5a and 5b at the connection parts between the optical fibers 5a and 5b and the high-Δ optical fibers 7a and 7b, the coupling loss can be reduced.

Also, the high-Δ optical fibers 7a and 7b are fixed to the capillary 9 or the like while being in contact with each other. Thus, the pitch between the cores 17a and 17b of the high-optical fibers 7a and 7b roughly depends only on the outer diameters of the high-Δ optical fibers 7a and 7b. For these reasons, each of the cores 17a and 17b of the high-Δ optical fibers 7a and 7b can be disposed accurately without being affected by the size or misalignment of the hole 8 of the capillary 9.

Also, since the connection parts between the optical fibers 5a and 5b with the high-optical fibers 7a and 7b are positioned inside the capillary 9, the connection parts can be protected efficiently. Also, when the outer diameter of the connection part is slightly increased, it is possible to make the size of the hole 8 larger compared to the size of the high-Δ optical fibers 7a and 7b, and thus the optical fibers can be inserted into the hole 8 with certainty and the insertion is easier.

Also, the high-Δ optical fibers 7a and 7b (the first optical fiber and the second optical fiber) together with the dummy fiber 7c are unified while being in the close-packed arrangement, and thus it is possible to make the high-Δ optical fiber 7a and 7b contact with each other with certainty. It is possible to improve the accuracy of the pitch between the cores 17a and 17b of the high-Δ optical fibers 7a and 7b, and thus the coupling loss with the coherent mixer chip 3 can be reduced.

At this time, as a method for disposing the fibers in the close-packed arrangement, surface tension of the diluted adhesive agent 25 is used. This can make sure that the fibers are disposed and adhered to each other easily in the close-packed arrangement.

Also, the high-Δ optical fibers 7a and 7b (the first optical fiber and the second optical fiber) are held temporarily by the temporary holding member 23, and thus the rotational core alignment of the high-Δ optical fiber 7b, which is a high-Δ polarization maintaining optical fiber, is easy.

Figure 10:
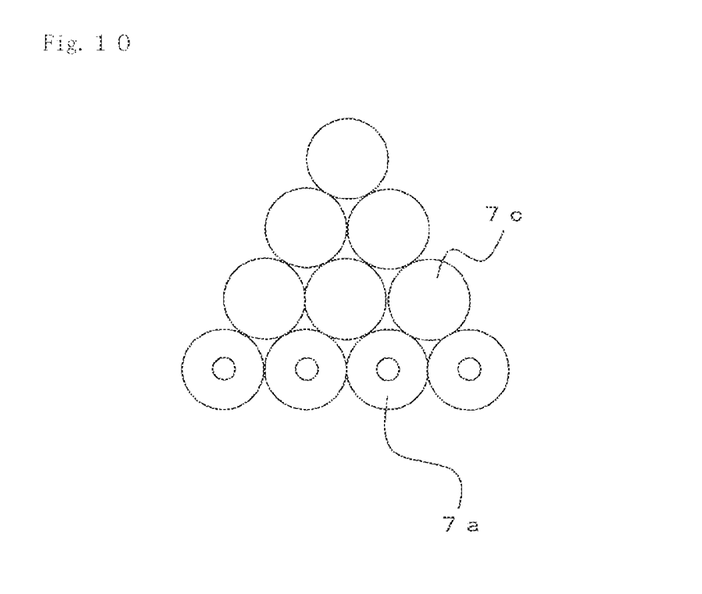

The above-mentioned embodiment illustrates an example in which three fibers of the high-Δ optical fibers 7a and 7b and the dummy fiber 7c are disposed in the close-packed arrangement. However, the present invention is not limited thereto. For example, as shown in FIG. 10, to arrange a plurality (three or more) of the high-Δ optical fibers 7a on a straight line while being in contact with each other, the dummy fibers 7c may be piled up so as to form a regular triangular shape as a whole (lines connecting the centers of the fibers on outermost periphery form a regular triangle) and adhered. Also in this case, the dummy fibers 7c may be removed after adhering.

Also, it is preferable that the dummy fiber 7c has the same outer shape as the high-Δ optical fiber 7a or 7b. However, instead of the circular cross section, other shapes such as a square or triangle may be applicable as long as the dummy fiber 7c can be in contact with the high-Δ optical fibers 7a and 7b at the same time.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

What is claimed is:

1. An optical fiber terminal structure comprising:
a plurality of optical fibers that are arranged in one direction, wherein at least one of the optical fibers is a polarization maintaining optical fiber;
a plurality of high-Δ optical fibers that are connected to the optical fibers respectively, wherein one of the plurality of high-Δ optical fibers is a high-Δ polarization maintaining optical fiber having a higher relative refractive index difference of a core to a cladding than that of the polarization maintaining optical fiber; and
a capillary having a hole through which the high-Δ optical fibers and the optical fibers are inserted, the capillary fixing the high-Δ optical fibers and the optical fibers as a whole, wherein:
connection parts between the high-Δ optical fibers and the optical fibers are positioned inside the capillary;
end surfaces of the high-Δ optical fibers are exposed on an end surface of the capillary so that the adjacent high-Δ optical fibers are in contact with each other; and
an arrangement direction of a core and a stress-applying member in the high-Δ polarization maintaining optical fiber substantially corresponds to an arrangement direction of the polarization maintaining optical fiber and another one of the plurality of high-Δ optical fibers that is adjacent to the high-Δ polarization maintaining optical fiber.

2. The optical fiber terminal structure according to claim 1, wherein a core diameter of the high-Δ optical fiber gradually increases toward a core diameter of the optical fiber at the connection part between the optical fiber and the high-Δ optical fiber.

3. An optical element connection structure that is a connection structure between the optical fiber terminal structure according to claim 1 and a coherent mixer chip, wherein:
   the coherent mixer chip comprises a signal port and a local oscillation light port as input ports, the coherent mixer chip being a high relative refractive index difference optical element of which a relative refractive index difference of a core to a cladding of a waveguide is between 2.5% and 10%;
   a pitch between the signal port and the local oscillation light port is approximately equal to a core pitch between the high-Δ polarization maintaining optical fiber and the another one of the plurality of high-Δ optical fibers adjacent to the high-Δ polarization maintaining optical fiber; and
   the another one of the plurality of high-Δ optical fibers adjacent to the high-Δ polarization maintaining optical fiber is connected to the signal port, and the high-Δ polarization maintaining optical fiber is connected to the local oscillation light port.

4. A method for manufacturing an optical fiber terminal structure, the method comprising:
   connecting a single mode optical fiber and a high-Δ single mode optical fiber having a higher relative refractive index difference of a core to a cladding than that of the single mode optical fiber to form a first optical fiber;
   connecting a polarization maintaining optical fiber and a high-Δ polarization maintaining optical fiber having a higher relative refractive index difference of a core to a cladding than that of the polarization maintaining optical fiber to form a second optical fiber;
   holding the first optical fiber and the second optical fiber so as to be movable by rotation;
   relatively rotating the second optical fiber and the first optical fiber to make an arrangement direction of a core and a stress-applying member of the high-Δ polarization maintaining optical fiber substantially correspond to an arrangement direction of the first optical fiber and the second optical fiber, and also contacting tip ends of the first optical fiber and the second optical fiber with an adhesive agent so that surface tension of the adhesive agent adheres and bonds the high-Δ single mode optical fiber and the high-Δ polarization maintaining optical fiber together;
   inserting the first optical fiber and the second optical fiber through a capillary after the adhesive agent is cured while positioning a connection part between the single mode optical fiber and the high-Δ single mode optical fiber and a connection part between the polarization maintaining optical fiber and the high-Δ polarization maintaining optical fiber inside the capillary;
   fixing the first optical fiber and the second optical fiber to the capillary; and
   polishing an end surface of the capillary to obtain an optical fiber terminal structure in which the high-Δ single mode optical fiber and the high-Δ polarization maintaining optical fiber are disposed at the end surface of the capillary being in contact with each other.

* * * * *